May 29, 1956        K. FRANK        2,748,223
THERMOSTATIC CONTROL MEANS
Filed Aug. 21, 1952        2 Sheets-Sheet 1
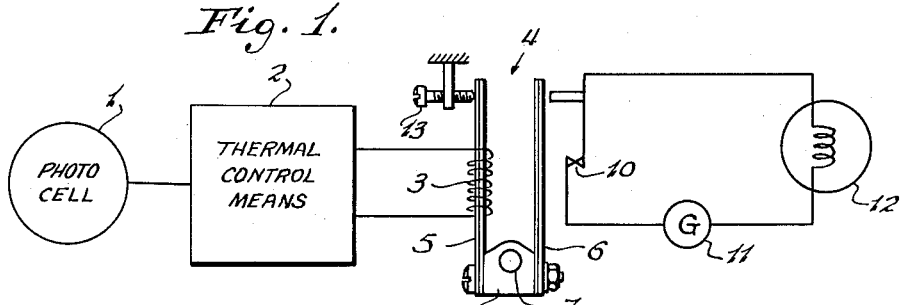
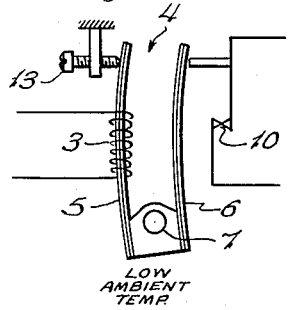
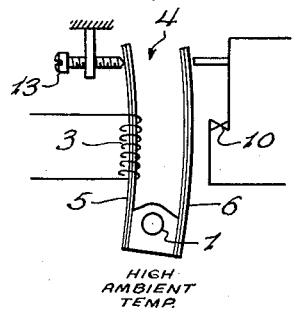
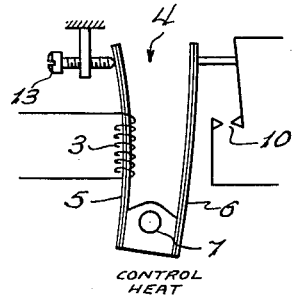
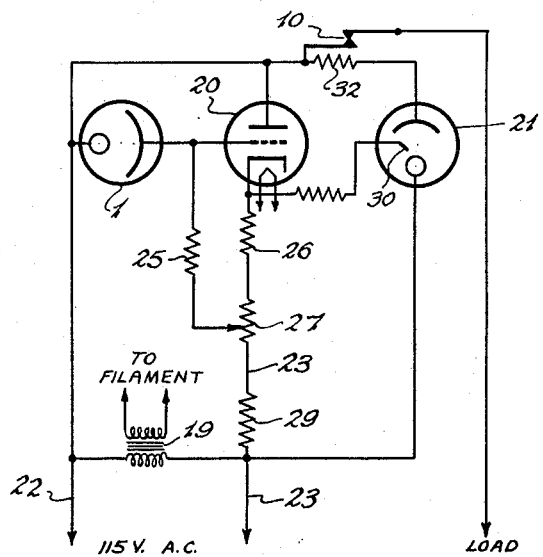
INVENTOR
KARL FRANK
BY
John C. McGregor
ATTORNEY May 29, 1956 K. FRANK 2,748,223
THERMOSTATIC CONTROL MEANS
Filed Aug. 21, 1952 2 Sheets-Sheet 2
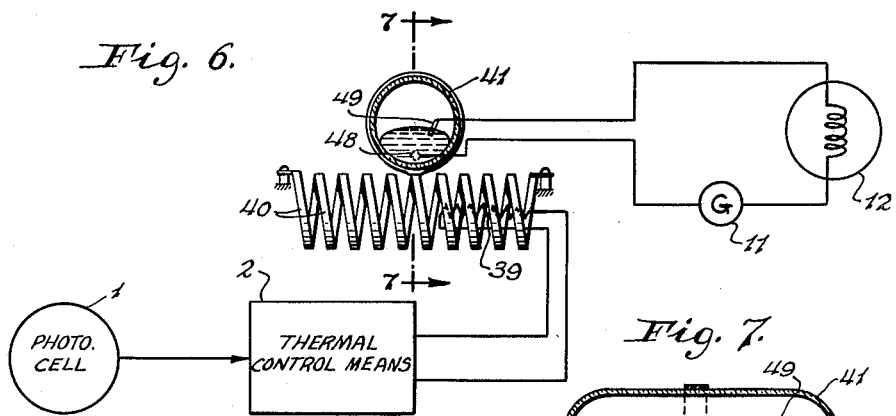
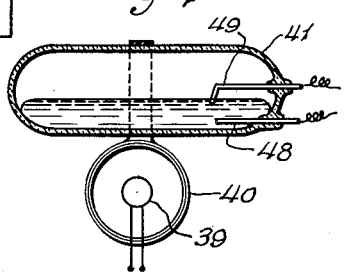
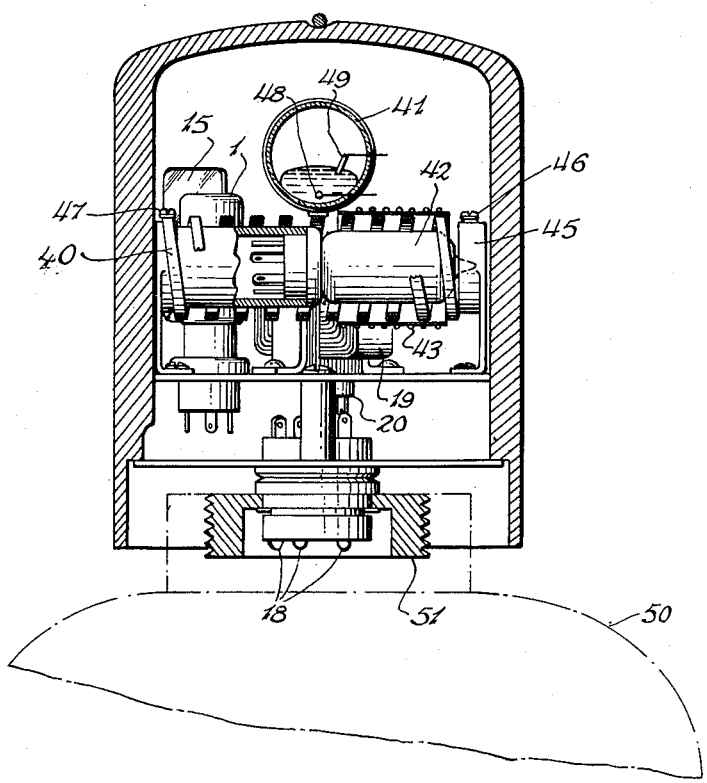
INVENTOR
KARL FRANK
BY
John C. McGregor
ATTORNEY

United States Patent Office 2,748,223
Patented May 29, 1956

2,748,223

THERMOSTATIC CONTROL MEANS

Karl Frank, Franklin Square, N. Y., assignor to Micro Balancing, Inc., New Hyde Park, N. Y., a corporation of New York Application August 21, 1952, Serial No. 305,644

3 Claims. (Cl. 200—122)

This invention relates to thermostatic control means and more particularly to dual thermostatic means which are substantially insensitive to ambient temperature.

The invention relates to my copending application S. N. 305,645, filed August 21, 1952, for Street Light Control means. In that application the dual thermostatic means of the present invention are used in a street light control system which is fully automatic. That system comprises generally a photo cell, thermal control means responsive to the average light intensity, and the present dual thermostatic means. The big problem in the street light control system is to use the control heat in a manner that is not sensitive to ambient temperature. The present invention provides such means.

Accordingly a principal object of the present invention is to provide thermostat means which is not sensitive to ambient temperature.

Another object of the present invention is to provide new and improved thermostat means.

Another object of the present invention is to provide new and improved automatic control means.

These and other objects of the invention will be apparent from the following specification and drawings of which:

Figure 1 is view of an embodiment of the invention; and

Figures 2, 3 and 4 are views illustrative of the operation of the invention.

Figure 5 is a schematic diagram of the embodiment of Figure 1.

Figure 6 is a view of another embodiment of the invention.

Figure 7 is a detail view of Figure 6.

Figure 8 is a mechanical assembly of the embodiment of Figure 6.

Figure 1 illustrates an embodiment of the invention utilized in an automatic street lighting control system. Photocell 1 is responsive to light intensity and is adapted to energize the thermal control means 2, the useful output of which is heat generated in output coil 3. The control heat is applied to one side of dual thermostat 4 which comprises a pair of bimetallic strips 5 and 6. The strips are joined together in a U shape by connecting member 9 which supports the weight of the strips and which is pivotally mounted at 7 to permit movement of the U shaped structure. Therefore as control heat is applied to strip 5 it bends, as shown in Figure 4. The free end of strip 5 is limited in motion by stop 13 so that the entire U shaped structure is displaced to the right and the free end of strip 6 actuates the power switch 10 to control the street light 12, disconnecting it from the power supply 11.

The dual thermostat is not sensitive to ambient temperature since a rise in ambient temperature will cause both strips to bend equally and in the same direction, so that the free end of the strip 6 could not actuate the switch 10.

Figures 2, 3, and 4 show in detail the operation of the dual thermostat under various conditions. Figure 2 shows the effect of low ambient temperature which causes both bimetal strips 5 and 6 to bend in the same direction. The power switch 10 is not actuated since the rotation of the structure about point 7 compensates for the bending.

Figure 3 shows the effect of high ambient temperature. This causes the strips 5 and 6 to bend in the opposite direction from Figure 2. The power switch 10 is still not actuated since the pivot motion compensates for the bending. The views of the bending are exaggerated for illustration.

Figure 4 illustrates the effect of application of control heat to strip 5 only. This causes the structure to pivot about point 7 but strip 6 does not bend and it therefore actuates the switch 10.

Figure 5 illustrates a schematic drawing of an embodiment of the invention. It comprises generally photo cell 1, triode amplifier vacuum tube 20 and glow tube 21. The 115 volt alternating voltage supply is applied to the leads 22 and 23. The plate of the triode 20 is connected to one side 22 of the alternating voltage supply and its cathode circuit to the other side. The photo cell 1 is connected between lead 22 and the grid of triode 20, and the grid and cathode of the triode are connected by grid resistor 25. The output of the triode 20 is taken across cathode potentiometer 26 and resistors 27 and 29, and is connected to the igniter element 30 of the cold cathode glow tube 21. The glow tube and its plate resistor 32 are also connected across the 115 volt supply mains. The glow tube 21 is of a type which requires a predetermined voltage to ignite and conduct current. The useful heat output may be taken from the thermal output resistor 32 and from the heat of the glow tube itself.

In operation, when the photo cell 1 is not conducting the triode 20 will pass a small amount of current but not sufficient to ignite the glow tube 21. However when the photo cell 1 is energized by light energy, it passes current and applies a relatively high voltage to the grid of the triode 20 during the positive half cycles. Therefore the triode 20 conducts heavily and the voltage across its cathode resistor 26 and sensitivity potentiometer 27 rises sufficiently to ignite the glow tube 21. The glow tube may be a type 58Z3 which will generate a suitable amount of heat. The triode may be a 6C3 or equivalent. Suitable values for the resistors in a particular embodiment are:

Resistor 25_____megohms__ 10
Resistor 26_____ohms__ 2200
Resistor 27_____ohms__ 2000

Suitable filament voltage for the triode may be provided by conventional means such as a filament transformer 19. Alternating voltage only is required which is a great advantage in practical use.

The advantage of the heat control in the street lighting system is that it integrates the average light intensity and is not sensitive to intermittent light such as lightning and automobile lights. However the present invention is not limited to this use as other applications of it may be made.

Many variations of the invention will occur to those skilled in the art. For instance the principle of the dual control thermostat means is to have a pair of elements such as bimetallic strips which are sensitive to heat and to mount them in such manner as to have no net mechanical movement due to equally applied heat such as ambient temperature. Then apply the control heat to one of them to provide the necessary mechanical movement.

Figure 6 illustrates another embodiment of the invention. It comprises a helix 40 composed of a bimetallic element. The helix is securely mounted at each end and will expand uniformly in response to ambient temperature changes, but will twist as heat is applied only to one end.

A mercury switch may be attached to the helix so as to be actuated by this twisting.

In operation the photo cell 1 actuates the thermal control means 2 to apply control heat to one end of the helix by means of heating coil 39. This causes the helix to twist and tilt the switch 41 thereby disconnecting the load 12 from the power generator 11.

Figure 7 is a cross section of Figure 6 taken at the line 7—7. It shows a cross section of the mercury switch 41, the helix 40 and the heating coil 39.

Figure 8 shows an embodiment of the invention utilized in a street light control system. It corresponds to the electrical diagram of Figure 5. Figure 8 shows a helix 40 made of a bimetallic element which will expand uniformly in response to a rise in ambient temperature but which will twist or rotate if heat is applied to one end of the helix. The mercury switch 41 is attached to the center portion of the helix and the heat producing means is glow tube 42 mounted inside one end of the helix. A heating element 43 connected in series with the glow tube may also be used if more heat is required. The helix is securely mounted on the frame or housing 45 at each end, i. e., points 46 and 47. The power switch 41 shown is a mercury type switch of the type having a pool of mercury which makes contact with the switch elements 48 and 49 when in a certain position.

In operation the switch will not be actuated by ambient temperature but will twist when heat is applied to one end of the helix to disconnect the load unit. The photo cell 1 may receive light through window 15 and actuate amplifier 20 to control the heat as explained previously. The entire assembly may be mounted in a street light globe 50 by coupling 19. Power may be applied through electric plug 51, via connector 18.

The invention is not limited to the particular embodiments shown since other variations of dual thermostatic means and other equivalents of the invention may be visualized.

What is claimed is:

1. Thermal control means comprising a first straight bi-metallic strip, a second straight bi-metallic strip, means connecting one end of each of said bi-metallic strips in a U configuration, said strips being arranged to bend equally in the same direction when heated equally, means to apply control heat to one of said strips, means to pivotally mount said joined strips so that said application of said control heat will additionally displace the position of said other strip from said first strip, and a switch adjacent the free end of said other strip and adapted to be actuated thereby.

2. A thermostat responsive to applied heat control, and insensitive to ambient temperature comprising a pair of bi-metallic elements connected at one end and free at their other end and adapted to bend in the same direction upon the application of heat, means to pivotally mount said elements so that changes in ambient temperature will not cause any mechanical displacement of their free ends relative to each other, means to apply control heat to one of said elements to thereby cause an additional mechanical spreading between said elements, and utilization means connected and adapted to be controlled by said displacement.

3. A thermostat responsive to applied heat control and insensitive to ambient temperature comprising a first longitudinal section of bimetal material, a second longitudinal section of bimetal material, said first and second sections of bimetal material each having one end thereof affixed relative one to the other, said sections being pivotally mounted and disposed that the remaining ends thereof suffer no relative displacement upon equal applications of heat thereto, utilization means connected to the remaining end of one of said sections, said utilization means being controlled by the displacement of the remaining end of one of said sections, and means to apply control heat to one of said sections, to provide additional spreading between said sections of bi-metal material.

References Cited in the file of this patent

UNITED STATES PATENTS

| | | |
|---|---|---|
| 963,763 | Harris | July 12, 1910 |
| 1,287,188 | Beck | Dec. 10, 1918 |
| 1,734,095 | Mancib | Nov. 5, 1929 |
| 1,840,114 | Lazich | Jan. 5, 1932 |
| 1,856,050 | Doman | Apr. 26, 1932 |
| 1,940,718 | Koch | Dec. 26, 1933 |
| 2,068,569 | Rog | Jan. 19, 1937 |
| 2,195,947 | Uhlrig | Apr. 2, 1940 |
| 2,207,942 | Person | July 16, 1940 |
| 2,326,529 | Frese | Aug. 10, 1943 |
| 2,367,059 | Rothwell et al. | Jan. 9, 1945 |
| 2,446,831 | Hottenroth | Aug. 10, 1948 |
| 2,499,208 | Zimmer | Feb. 28, 1950 |
| 2,658,975 | Zuckerman | Nov. 10, 1953 |

FOREIGN PATENTS

| | | |
|---|---|---|
| 33,729 | France | Apr. 8, 1927 |